United States Patent [19]
Rinaldi et al.

[11] Patent Number: 6,067,092
[45] Date of Patent: May 23, 2000

[54] AUTOMATIC VIDEO OVERLAY ALIGNMENT METHOD AND APPARATUS

[75] Inventors: Antonio Rinaldi, Maple; Raymond Li, Markham, both of Canada

[73] Assignee: ATI Technologies, Inc., Thornhill, Canada

[21] Appl. No.: 08/899,519

[22] Filed: Jul. 24, 1997

[51] Int. Cl.[7] .................................................. G06T 3/00
[52] U.S. Cl. .............................................................. 345/435
[58] Field of Search ............................ 345/302, 433–436

[56] References Cited

U.S. PATENT DOCUMENTS 5,579,057  11/1996  Banker et al. ........................... 348/589
5,668,594   9/1997  Cahill, III ............................... 348/194

Primary Examiner—Almis R. Jankus
Attorney, Agent, or Firm—Markison & Reckamp, P.C.

[57] ABSTRACT

A method and system to automatically align overlaying video data on a computer screen based on input information of R or G or B data, horizontal synchronization signal data (Hsync) and vertical synchronization signal data (Vsync) automatically reconstructs a pixel clock time base of an offboard underlying graphics source for use in aligning overlaid video using a generated vertical pixel pattern. The system and method also automatically detects a size of an active computer screen region and position of a top left hand corner and a bottom right hand corner of the active computer screen region to align overlaying video using the reconstructed pixel clock time base and a single color block pattern.

16 Claims, 12 Drawing Sheets

AUTOMATIC VIDEO OVERLAY ALIGNMENT METHOD AND APPARATUS

BACKGROUND OF THE INVENTION

The invention relates generally to video overlay systems for computers and more particularly to video overlay systems that do not receive pixel clock data from an underlying graphic source generator.

Existing computer systems facilitate overlaying of video information on top of graphic information on computer screens. To accomplish this, many computer systems have a separate underlying graphics source card and a separate video overlay source generator (card). The graphics source card produces graphic images on the computer screen. The separate video overlay source system is used to overlay video images on top of graphic images produced by the graphics card. It is important that the overlaid video image be placed precisely where desired by the user and within the active region of the computer screen.

Often times, the video overlay source system is a peripheral unit added to the computer system. Therefore, the graphics card pixel clock is not communicated to the video overlay source system. However, to properly align video overlay data onto underlying graphics, the video overlay source system needs to know the pixel clock to properly display and align the video overlay so that the size of the active region of the display screen and the position of the active region of the display screen are used to properly align the video overlay information.

Because video overlay source generators may not know where the active screen region limits are located due to the fact that the pixel clock information is on the graphics controller card and not communicated to the overlay source system, the overlay source system must somehow obtain this information. In conventional overlay source systems, the size and position of the active region of the screen is typically estimated based on interactive information entered by the user.

Conventional overlay systems typically estimate a pixel clock of the graphics controller card by having the user draw and align two boxes. The software first draws a box with the graphic controller card outlining the active region of the computer screen and subsequently draws a similar sized box using the overlay source system. The user then moves the video overlay box to try to align it with the box generated by the graphics controller card. Once approximately aligned, the overlay source then estimates the pixel clock. This calibration process is a cumbersome process for the user and can result in alignment errors if the user does not properly size the boxes during the process or position the boxes at the correct position during the calibration process. If not properly sized and positioned, the overlay source may overlay video in a non-active portion of the display screen. Moreover, increased temperatures of the system can cause thermal drifting of the active screen location. In conventional systems, the user is required to recognize this condition and repeat the same interactive calibration process to compensate for the thermal drift.

Therefore, there exists a need to have a more accurate and time saving system to facilitate proper alignment of video overlays. It would be desirable if such a system automatically calibrated itself to properly align overlaying video data on a computer screen without the need for user interaction. Moreover it would be desirable to have an automatic system that could accommodate for thermal drift without requiring a user to manually interact and attempt to provide the alignment information for the computer system.

BRIEF DESCRIPTION OF THE DRAWINGS

The features of the present invention together with the advantages thereof, may be understood by reference to the following description taken in conjunction with the accompanying drawings wherein.

DETAILED DESCRIPTION OF THE INVENTION

Figure 1A:
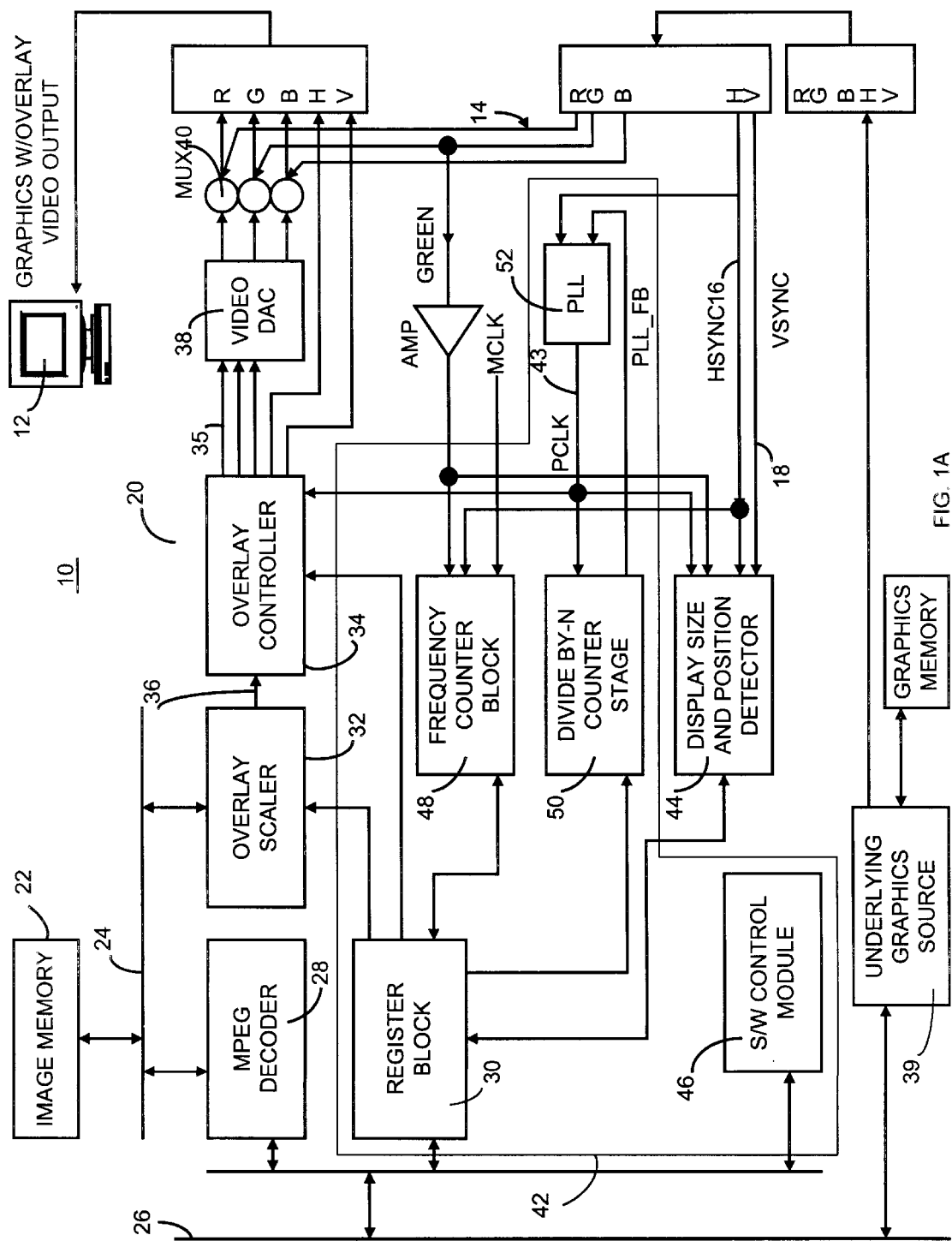
FIG. 1A is a block diagram generally depicting a system to automatically align overlaying video data on a graphics display or computer screen in accordance with one embodiment of the invention.
Figure 1B:
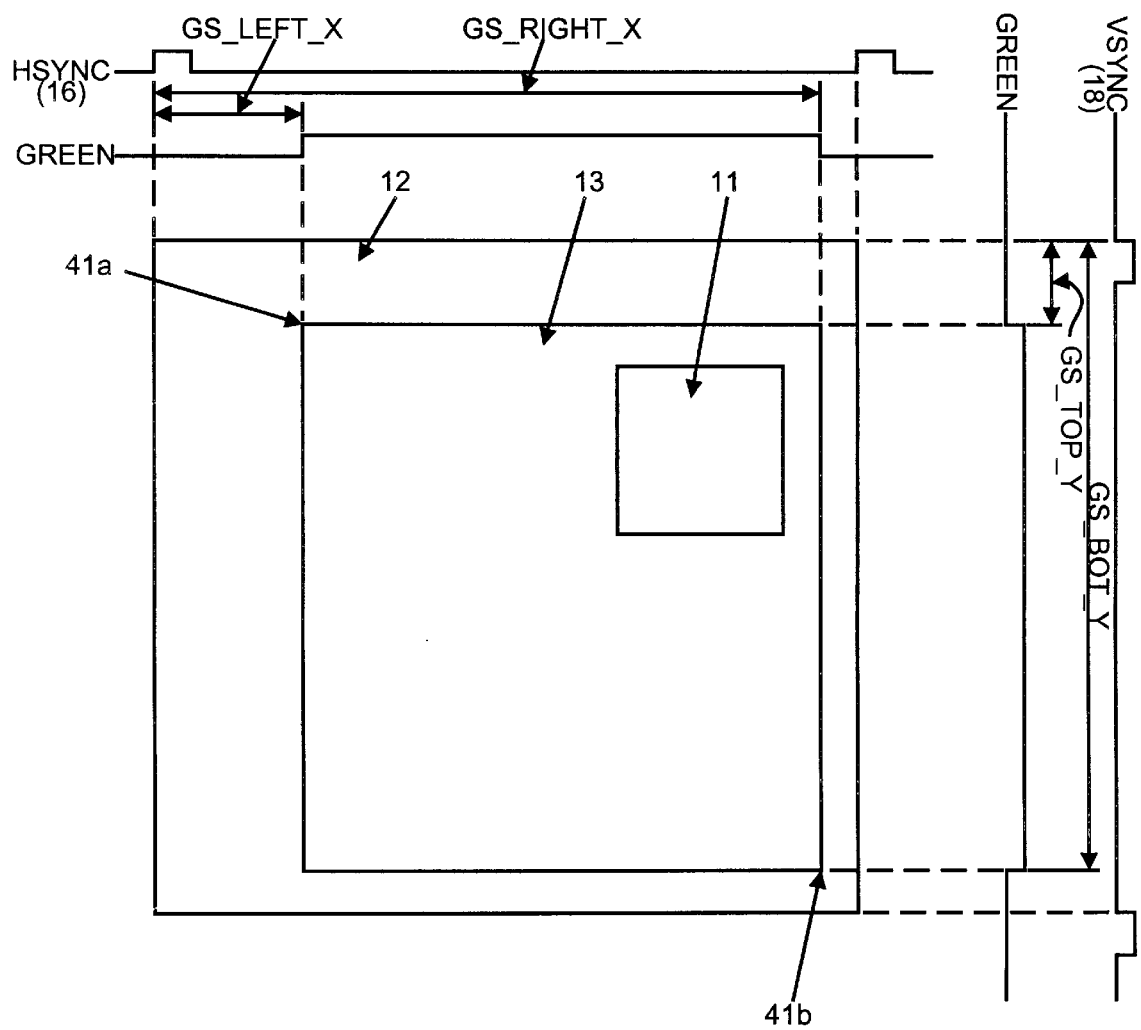
FIG. 1B illustrates the determined active region of the graphics display screen containing a video overlay and associated signal data and location data as used and determined in accordance with one embodiment of the invention.

FIG. 1 shows one embodiment of a system 10 to automatically align overlaying video data 11 on an RGB computer screen 12, having active screen region 13, based on input information of red or green or blue data generally indicated at 14. The system 10 also receives additional input information of horizontal synchronization signal data (Hsync) 16 and vertical synchronization signal data (Vsync) 18. The system 10 includes a video overlay source system 20 (video overlay card) which communicates with image memory 22 through memory bus 24. The video overlay source system 20 also communicates with a main computer processor through a host interface bus 26.

The video overlay source system 20 includes an MPEG decoder 28 or other suitable video decoder which is accessible by the main computer processor through host interface bus 26. As known in the art, the MPEG decoder 28 codes a compressed video screen received from the PCI or host interface bus 26 and stores the decoded image in the image memory 22. The overlay scale 32 retrieves the decoded image from image memory and scales the image to the appropriate size as known in the art.

The video overlay source system 20 further includes a register block 30 containing a series of registers for use in aligning and overlaying video data on the computer screen. An overlay scaler 32 scales the video to be overlayed according to size parameters received from host interface bus 26 as known in the art. An overlay controller 34 receives overlay scaler data 36 and outputs the digital overlay information 35 in RGB format for output to the computer screen 12. The digital overlay information 35 is processed through a video digital to analog converter 38 as known in the art. The RGB information 14 received from an offboard underlying graphics source 39 is multiplexed with the analog overlay RGB information through multiplexer 40 as known in the art. The mulitplexed RGB information is connected to the computer screen 12 through a connector (shown).

The register block 30 contains registers that store information such as scale size data for the overlay scaler 32. For example if the user wishes to have a larger overlay or smaller overlay, the size of the overlay can be adjusted via use of the cursor and the scale size information is sent to the overlay scale 32 to scale the overlay image received from memory bus 24. In addition, the register block 30 stores information in its registers, such as coordinate information of the overlay, the position data, upper left corner, lower right hand corner of the active region as determined from the display size and position detector, for overlay controller 34. The overlay controller 34 uses the top left hand corner active screen coordinate 41a and right hand corner active screen coordinates 41b to properly locate the video overlay where indicated by the user through cursor locations generated by the graphics card. The overlay controller 34 also receives the reconstructed pixel clock data. The pixel clock data is used to align overlay data with the underlying information on the screen from underlying graphics source 39.

The system 10 includes pixel clock time base reconstruction circuitry 42 for reconstructing a pixel clock time base, referred to herein as pixel clock (PCLK) signal 43, of the off board underlying graphics source 39 or a graphics card, for use in aligning overlaid video. The system 10 further includes display size and position detector 44 for detecting a size of the active computer screen region 13 and position of the top left hand corner 41a and bottom right hand corner 41b of the active computer screen region 13 to align overlaying video 11 using the reconstructed pixel clock time base. The reconstruction of the pixel clock and the detection of the size and position of the active screen region is performed automatically without requiring user entered size/position boxes or other alignment information as described below.

The pixel clock time base reconstruction circuitry 42 includes a software control module 46 for communicating with the main computer processor (CPU) over interface 26. The software control module 46 in combination with the CPU and the graphic source 39 generates a vertical pixel pattern on the computer screen 12 as further described below. The pixel clock time base reconstruction circuitry 42 also includes in addition to register block 30, a frequency counter block 48, a divide by N counter block 50 and a phase lock loop block 52 for use in reconstructing of the pixel clock time base of the off board underlying graphics source 39.

Figure 2:
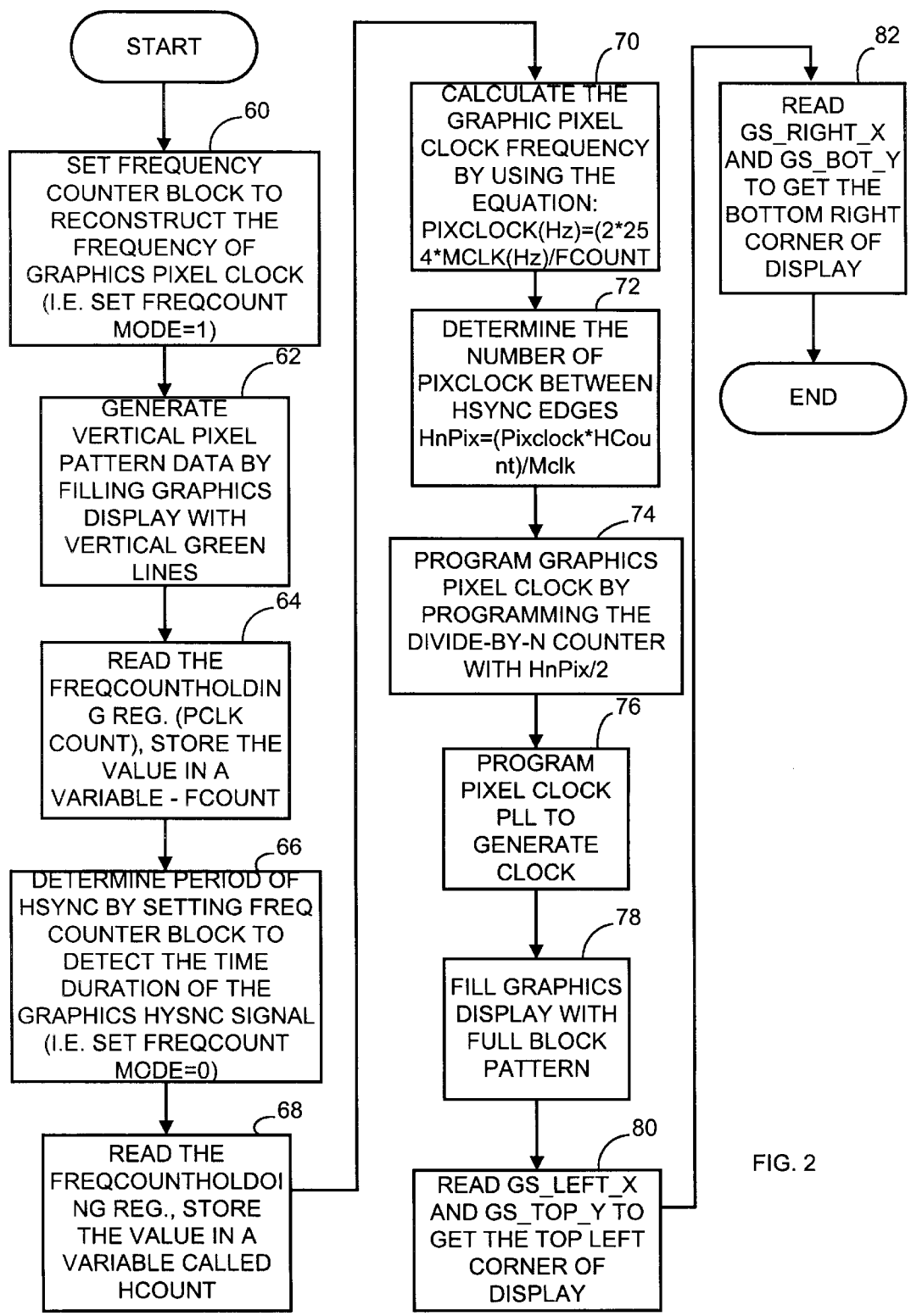
FIG. 2 is a more detailed flow diagram depicting a method to automatically align overlaying video data on a computer screen in accordance with one embodiment of the invention.

FIG. 2 shows the general method carried out by the software module and hardware components of the system 10 in FIG. 1 to automatically align overlying video data on a computer screen based on input information of red or green or blue data, horizontal synchronization signal data (Hsync) and vertical synchronous data (Vsync). The system 10 reconstructs the pixel clock time base of the video graphics card to automatically determine the position of the active region of the screen and the size of the active region of the screen automatically. To accomplish this, the software control module 46 sets the frequency counter block 48 in a frequency count mode to reconstruct the frequency of the off board graphics pixel clock as indicated in step 60. Under control the software control module 46, the CPU causes the underlying graphics source 39 to generate vertical pixel pattern data by filling the graphics display screen 12 with vertical green lines so that one pixel is on and the next vertical pixel is off as shown in block 62. The graphics controller card also communicates over the host interface 26.

The register block 30 contains a frequency count holding register that stores a counted number of horizontal pixel transitions from the vertical pixel pattern data. The frequency counter block 48 determines the number of pixel clocks during the period of the horizontal synchronization signal data (Hsync) for use in reconstructing the pixel time base clock 43. In operation, the software module 46 reads the counted number of horizontal pixel transitions from the frequency count holding register (PclkCount) and stores the value as FCOUNT (a variable) as indicated in block 64. The period of the horizontal synchronization signal data is determined by the frequency counter block 48 by detecting edges of the Hsync signal data as shown in block 66. The frequency counter information indicating the duration of the graphics Hsync signal data is initiated by setting a frequency count mode bit to 0. The frequency counter block 48 detects the period or time duration between rising edges of the graphics Hsync signal and stores the value in register block 30 in the frequency count holding register. The software module 46 causes the CPU to read the value in the frequency count holding register and store it as a variable called HCOUNT as shown in block 68. Hence, the system 10 uses the same frequency count holding register to temporarily hold both the number of horizontal pixel transitions in the pattern and to subsequently store the value representing the period of the graphics Hsync signal data. However, it will be recognized that separate registers may also be used if desired.

In block 70, the system 10 determines the graphic pixel clock frequency by using the following equation:

$$PIXCLOCK(Hz) = (2 \times 254 \times MCLK)(Hz)/FCOUNT,$$

where MCLK is the frequency of the master clock (memory clock). In this way the system calculates the graphic pixel clock frequency. As shown in block 72, the CPU under control of the software control module 46, determines the number of pixel clocks during the period of the horizontal synchronous signal based on the following formula:

$$HnPIX = (PIXCLOCK * HCOUNT)/MCLK.$$

Seen another way, this equation results from substituting PIXCLOCK into the above HnPIX equation such that:

$$HnPIX = (((2*254*MCLK)/FCOUNT)*HCOUNT)/MCLK$$

The system 10 then programs the divide by N counter 50 with the HnPIX value divided in half as indicated in block 74. As shown in block 76, the divide by N counter block 50 generates a phase lock loop feedback signal which is used by the phase lock loop block 52 to generate a reconstructed pixel clock time base of the off board underlying graphics source so that the reconstructed clock is the same as the graphics pixel clock used by the offboard underlying graphics source 39.

Next, to determine the display size and position of the active region of the display screen, the system 10, using software control module 46, requests that the CPU and graphics source 39 fill the graphics display 12 with a full block pattern such as a full block color pattern of all green as shown in block 78. The display size and position detector 44 then determines a horizontal active screen region as corresponding to a period between a rising horizontal edge of the full block pattern and a falling horizontal edge of the full block pattern relative to the Hsync data using the recontstructed pixel clock time base to determine the graphics screen left X coordinate and the graphics screen right X coordinate. The display size and position detector 44 also determines a vertical active screen region as corresponding to a period between a rising vertical edge of the full block pattern and a falling vertical edge of the full block pattern relative to the Vsync signal data using the reconstructed pixel clock time base and also by counting edges of the Hsycn signal to determine a number of lines within the vertical active screen region to determine the graphics screen top Y coordinate and the graphics screen bottom Y coordinate.

To overlay video information, the system 10 reads the graphics screen left X and the graphics screen top Y coordinate to get the top left corner of the graphics screen as shown in block 80. Similarly, the system 10, through the CPU, reads the graphics screen right X coordinate and the graphics screen bottom Y coordinate from the register block 30 to obtain the bottom right corner of the graphics display screen as indicated in block 82. In this way the active region display size and position is determined. Therefore, the top left corner of the active screen region is stored along with the bottom right corner of the active screen region. These coordinate values are stored in register block 30 and represent an absolute position of the active screen region which are used to facilitate overlying video on the computer screen.

Figure 3:
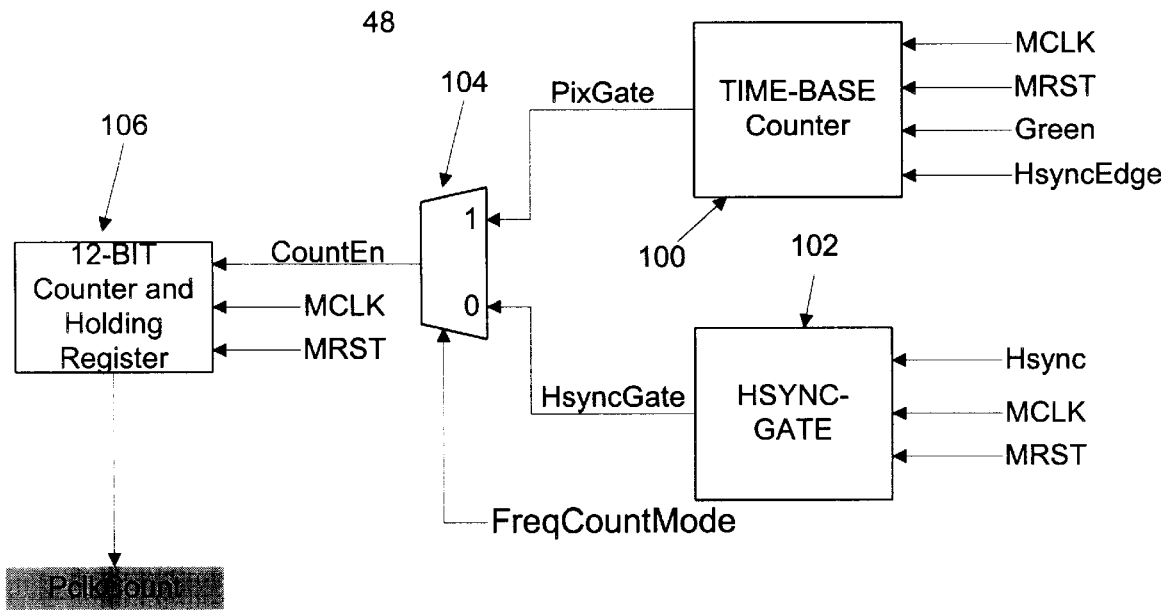
FIG. 3 is block diagram depicting the frequency counter block of FIG. 1A in more detail.

FIG. 3 shows the frequency counter block 48 which includes a time base counter 100, Hsync gate circuit 102, a multiplexer 104 and a 12 bit counter and holding register 106. The frequency counter block 48 receives master clock input data, (MCLK) vertical pixel pattern data (green) and Hsync data to count a number of horizontal pixel transitions from the vertical pixel pattern data per period of Hsync signal data. The time base counter 100 determines how many MCLKS fit into 254 horizontal transitions of the vertical pixel pattern data to determine the frequency of the vertical pixel pattern data. The time base counter also counts the number of MCLKS fit between rising edges of consequetutive Hsync pulses to determine the divide by-N counter value (the number of PCLKS per Hysync pulse), so the PLL 52 can generate the PCLK pulse.

The Hsync gate circuit 102 receives Hsync signal data and master clock data to detect the transitions of horizontal synchronous signal for use in determining the period of the Hsync signal data. As shown, both the time base counter 100 and the horizontal synchronous gate circuit 102 receive a master reset signal (MRST) to reset the counters on power-up of the system.

The time base counter 100 generates a one bit count signal PIX GATE which is received by the multiplexer 104. The horizontal synchronous gate circuit 102 generates a one bit horizontal sync transition detection signal (Hsync gate) which is received by the multiplexer 104. The multiplexer 104 also receives a frequency count mode control signal to switch between a pixel clock frequency count mode to count horizontal transitions from the vertical pixel pattern data and Hsync time duration count mode to determine the period of the Hsync signal. The multiplexer 104 outputs count enable data to a 12 bit register counter and holding register 106 that stores the pixel count value for use in determining the reconstructed pixel clock time base. Hence the mulitplexer 104 multiplexes an output from the time base counter 100 and the horizontal synchronous gate 102 to activate a counter 106 to produce a pixel clock count value (PCLKCOUNT). The time base counter is an 8 bit counter, but only two of the 256 values are used to provide a two clock width gate signal (PIXGATE) to allow the system 10 ample time to store a time base count (i.e., HnPIX/2 value). The time base counter is incremented on each detection of a new transition of a colored pixel in the vertical pixel pattern and is reset when a new Hysnc pulse is detected.

The multiplexer 104 enables the counter and holding register 106 to be incremented when the Pix Gate is set to a one and the frequency count mode bit is set to one. Similarly, the multiplexer 104 enables the counter and holding register 106 to be incremented when the HsyncGate bit is set to one and the frequency count mode bit is set to zero.

Figure 4A:
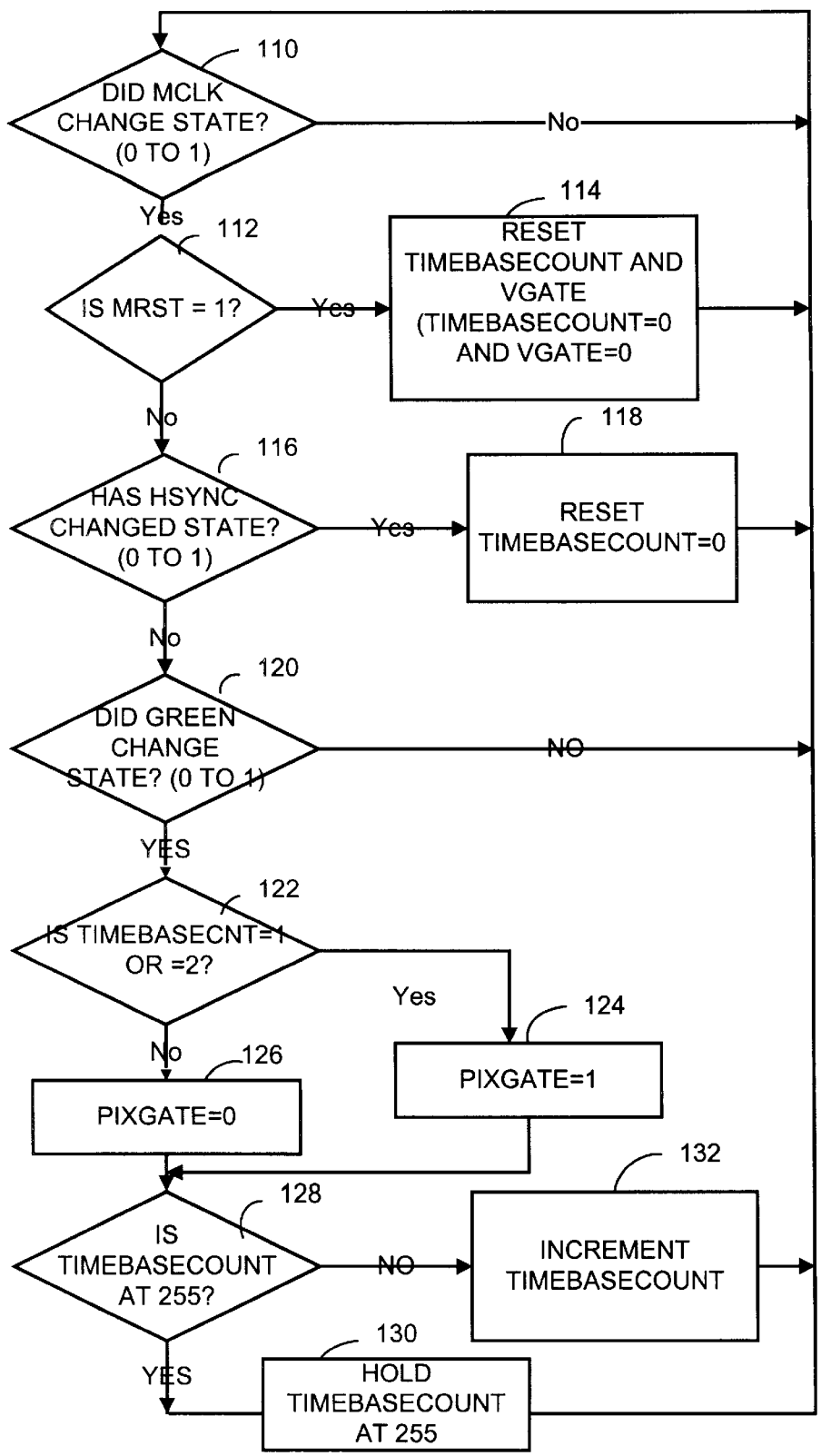
FIG. 4A is a flow diagram generally depicting the method of operation of the frequency counter of FIG. 3.

FIG. 4A shows the operation with the software control module 48 in connection with the frequency counter block 48 to determine a number of pixel clocks based on the vertical pattern data. The frequency counter block 48 detects whether a master clock state has changed from a zero to a one as indicated in block 110. If the master clock state has changed, the system 10 determines whether the power on reset (MRST) has occurred as indicated in block 112. If the power on reset has occurred, the time base counter 100 is reset and all counters are reset as indicated in block 114.

If however no power-on reset has occurred but a rising edge transition of the master clock has been detected, the time base counter 100 determines whether the Hsync signal data has changed state from a zero to a one indicating the beginning of a period of Hsync signal data as shown in block 116. If the Hysnc signal data shows a changed state, the time base counter 100 is reset to 0 as indicated in block 118. If the Hsync signal data does not indicate a transition, the frequency counter block 48 determines whether the horizontal transition from one pixel in the vertical pixel pattern to another has changed state from a zero to a one as indicated in block 120. If there is a state change in the vertical pixel pattern data, the frequency counter block determines if the time base counter is equal to a 1 or a 2, as indicated in block 122. The time base counter serves to reduce the frequency by generating a pulse every fixed number of MCLK pulses.

If the time base count equals a 1 or a 2, the output (PIXGATE) from the time base counter is set to a 1 as shown in block 124 to enable the counter 106. If however the time base count is not equal to a 1 or a 2, the output from the time base counter (PIXGATE) is set to a zero as indicated in block 126. The time base count is continually incremented until it is reset when a beginning of an Hsync signal occurs. If the time base counter is full (equal to 255) as shown in block 128, the time base counter time is kept at 255 as indicated in block 130 until a new Hsync signal is detected. If however the time base count is not equal to 255 then the time base counter is incremented as shown in block 132 and the process continues for each master clock pulse.

Figure 4B:
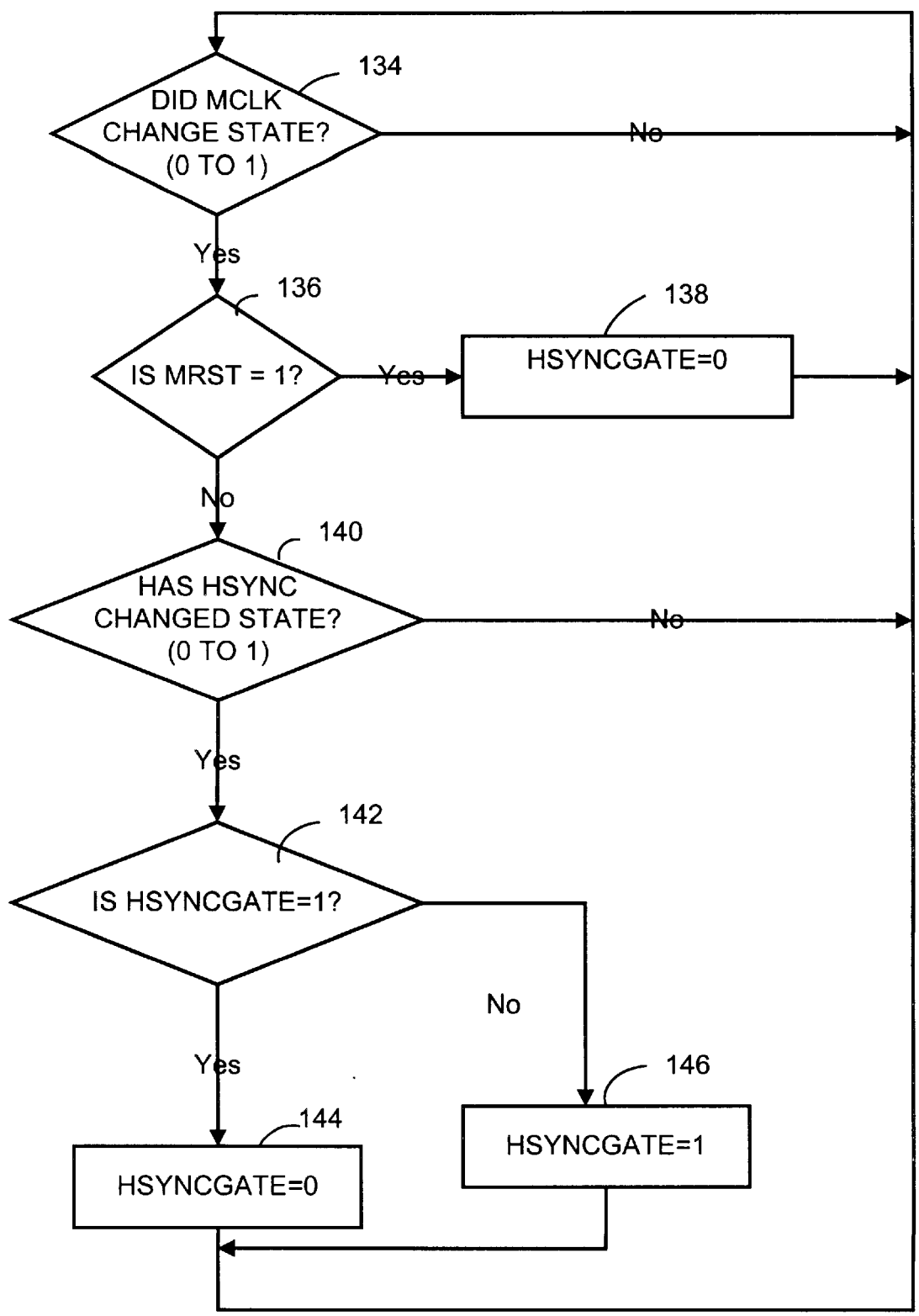
FIG. 4B is a flow diagram generally depicting the operation of Hsync gate shown in FIG. 3.

FIG. 4B shows the operation of the horizontal synchronous gate circuit 102 starting in block 134 where the horizontal synchronous gate 102 determines if the master clock (MCLK) has changed state from a zero to a one. If no change in state has occurred, the gate 102 waits until a state change does occur. The horizontal synchronous gate circuit 102 also determines whether the master reset has taken place based on the master reset signal (MRST) as indicated in block 136. If a master reset has occurred based on the MRST signal, the Hsync gate output is set to 0 as indicated in block

138. If however no master reset has occurred the horizontal sync gate 102 determines whether the horizontal synchronous signal data indicates a changed state from a zero to a one as indicated in block 140. If a state change or transition has occurred as indicated in block 142, the horizontal synchronous gate circuit 102 determines if the HsyncGate output bit is equal to a 1. If the output bit is equal to a 1 then the Hsync gate output is set to a 0 as indicated in block 144. If however the output from the horizontal synchronous gate circuit 102 is not equal to 1 then the output is set to 1 as indicated in block 146 and the process is repeated for each master clock pulse.

Figure 5:
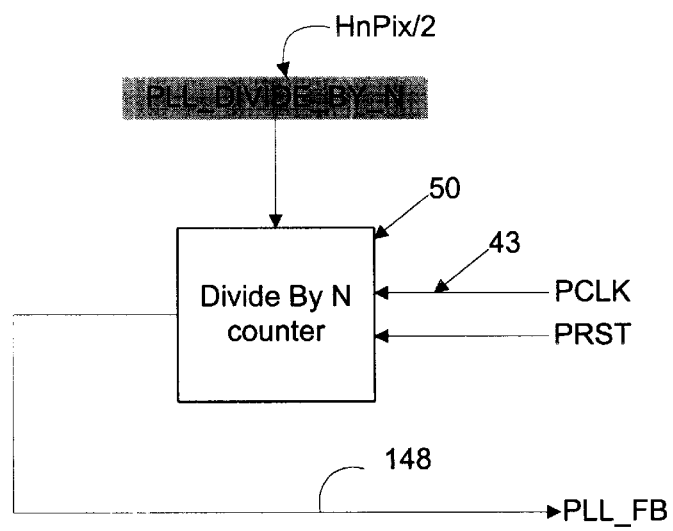
FIG. 5 is a block diagram depicting in more detail the divide by N counter block shown in FIG. 1A.

FIG. 5 shows the divide by N counter 50 that receives the reconstructed pixel time base clock 43 and reset signal (PRST) along with the phase lock loop divide by N value (HnPIX/2) stored in PLL_DIVIDE_REGISTER in register block 30. The signal PRST is the master reset signal synchronized to the reconstructed pixel clock so that the reconstruction circuitry is also reset upon an occurrence of a master reset condition. The phase lock loop divide by N value is the HNPIX/2 value.

Figure 6:
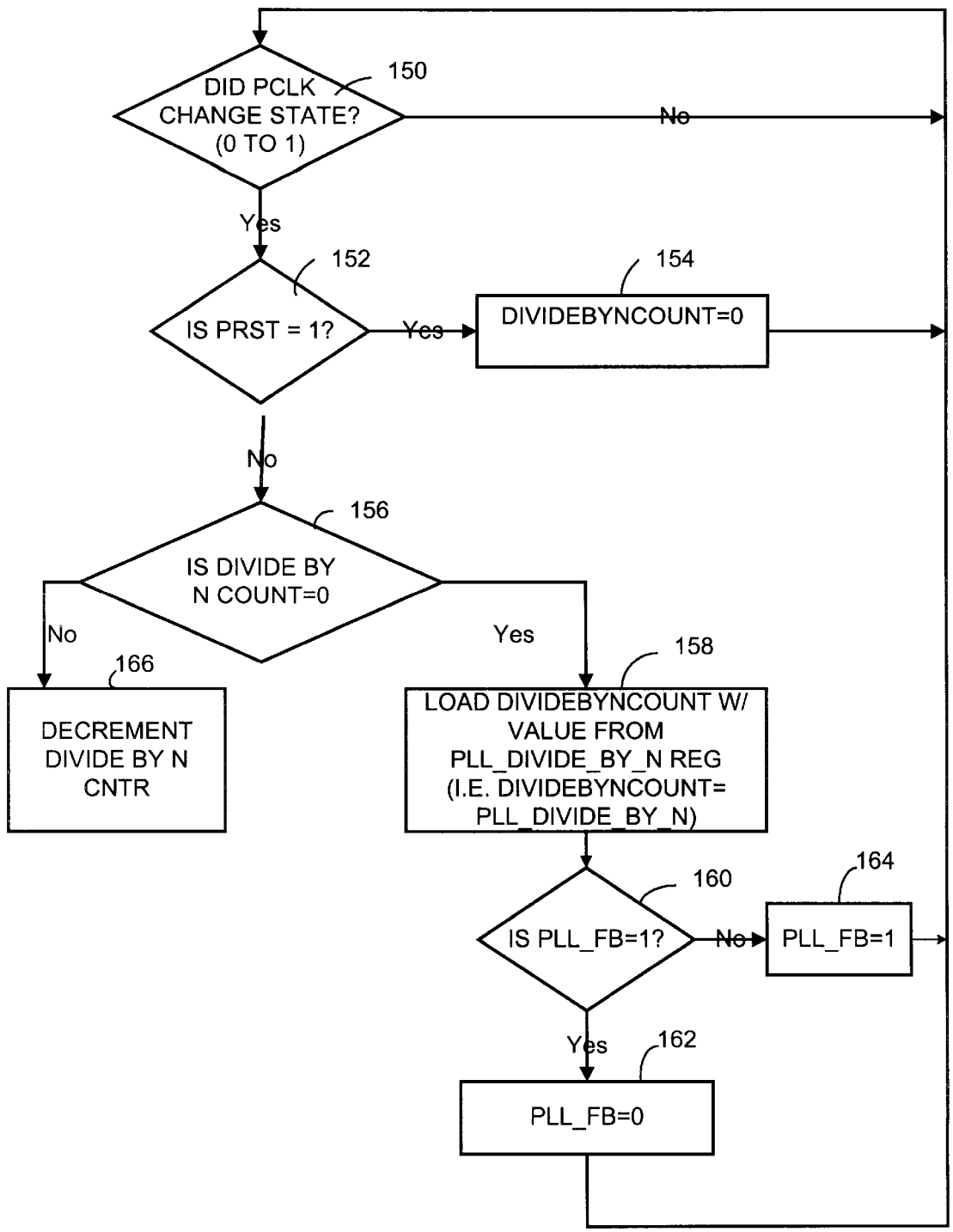
FIG. 6 is a flow diagram generally depicting the operation of the divide by N counter shown in FIG. 5.

FIG. 6 shows the operation of the divide by N counter 50. As shown in block 150, the divide by N counter 50 determines whether the reconstructed pixel clock time base (PCLK) has changed state from a zero to a one. If a state change has occurred, the divide by N counter 50 determines whether a reset has occurred as indicated in block 152. If a reset has occurred, the divide by N counter is set to 0 as indicated in block 154. If however no reset has occurred, the divide by N counter decrements until it reaches 0 as indicated in block 156. If the divide by N counter equals 0 then the divide by N counter reloads the value from the PLL_DIVIDE_BY_N register as indicated in block 158. As shown in block 160, the divide by N counter block 50 determines if the phase lock loop feedback value 148 is equal to 1. If the feedback value 148 is equal to 1, it is set to 0 as indicated in block 162. If the phase loop lock feedback value 148 is not equal to 1 the feedback value 148 is set to 1 as shown in block 164. Returning to block 156, if the divide by N counter value is not equal to 0 the counter is decremented as indicated in block 166.

Figure 7:
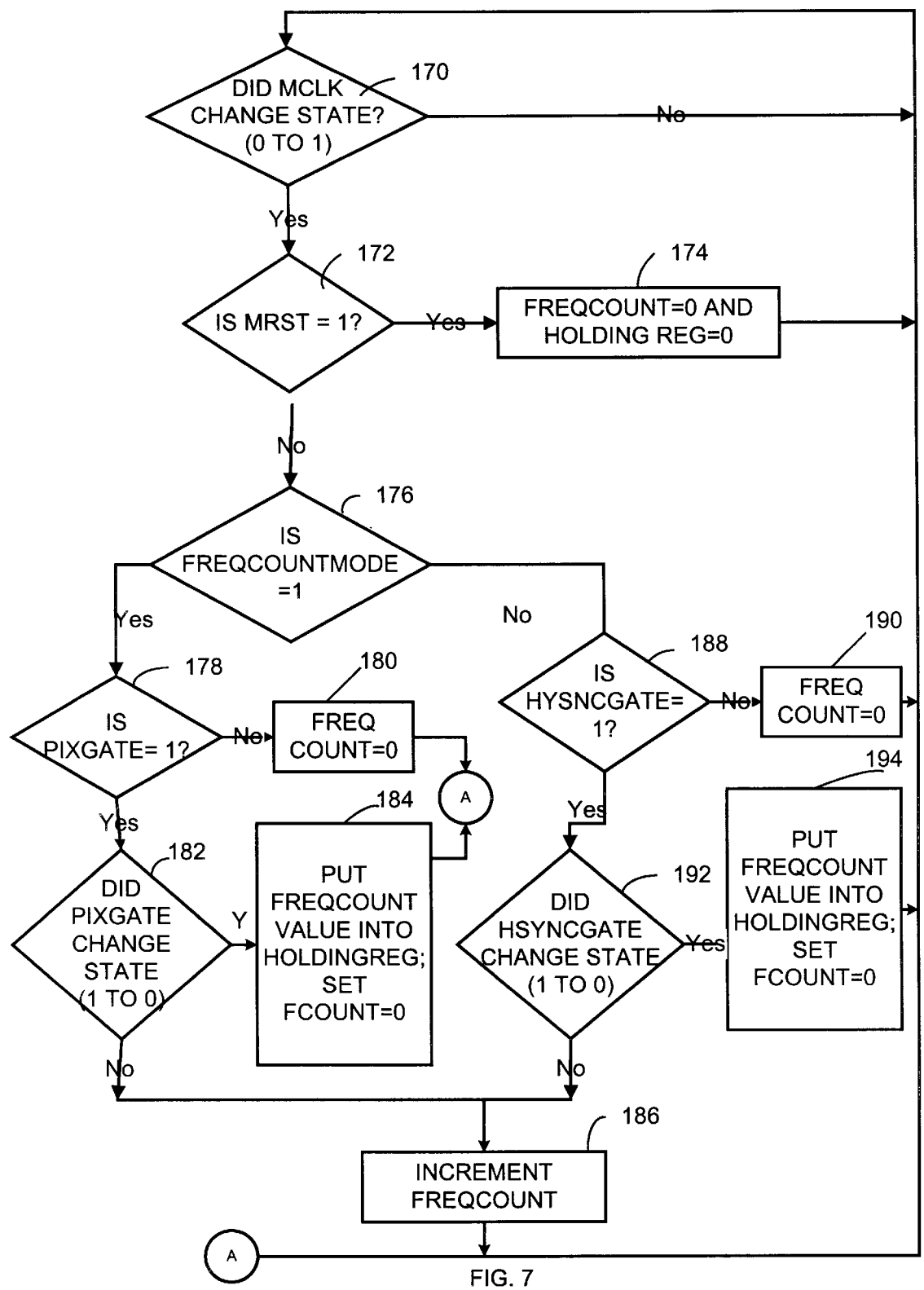
FIG. 7 is a flow diagram generally depicting the operation of the 12-bit counter and holding register shown in FIG. 3.

FIG. 7 shows the operation of the counter and holder register 106. As shown in block 170, the counter and holding register 106 receives the master clock input and determines whether the master clock state has changed from a zero to a one. If it has changed, the counter and holding register 106 determines whether the master reset has occurred as indicated in block 172. If a reset has occurred, the counter and holding register 106 sets the FCOUNT equal to 0 and the holding register count equal to 0 as indicated in block 174. If no reset has occurred, the counter and holding register 106 determines if the frequency count mode is set equal to 1 indicating that the count will be used to count the horizontal transitions of the vertical pattern data. This is shown in block 176.

If the frequency count mode is set to 1, the counter and holding register 106 determines if the output bit (PIXGATE) from the time base counter 100 is set to 1 as indicated in block 178. If the output bit from the time base counter 100 is set to 0, the frequency count is set 0 as indicated in block 180. If the pixel gate value or time base counter output is set to 1, the counter and holding register 106 determines if the pixel gate value changed state from a one to a zero as shown in block 182. If the output from the time base counter 100 has changed state, the frequency count value is put in the holding register and the frequency count is cleared to 0 as indicated in block 184. If however the pixel gate does not change state then the frequency counter is incremented as indicated in block 186.

Returning to block 176, if the frequency count mode is not set to 1, the frequency counter block determines if the output from the horizontal synchronous gate 102 is set to 1 as shown in block 188. If the horizontal gate output is not set to 1, the frequency count is set to 0 as indicated in block 190. If however the horizontal sync gate output is set to 1 indicating the system 10 determines if the Hsync gate output changed state from a one to a zero as indicated in block 192. If a change of state has occurred, the system 10 puts the frequency count value into the holding register and sets the frequency count equal to 0 as indicated in block 194. If the horizontal synchronous gate value did not change state, the frequency counter is incremented as indicated in block 186.

Figure 8:
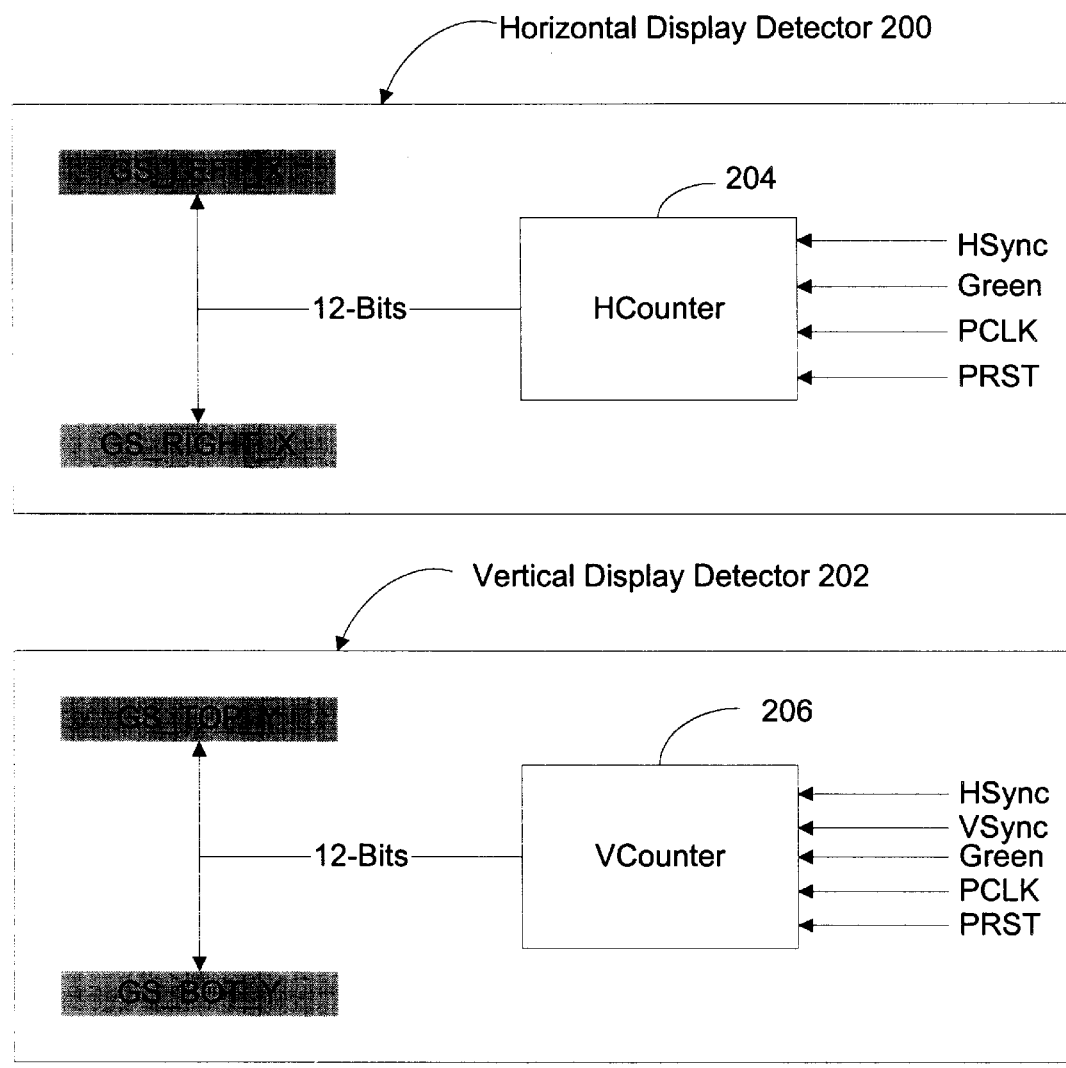
FIG. 8 is a block diagram depicting one embodiment of the display size and position detector of FIG. 1A.

FIG. 8 shows a horizontal display detector 200 and a vertical display detector 202 used in the display size and position detector 144 for determining the upper left corner and lower right corner of the active region of the display screen. The horizontal display detector 200 and vertical display detector 202 detect the size of the active computer screen region and the position of top left hand corner and bottom right corner of the active computer screen region for use in aligning overlaid video.

Figure 11A:
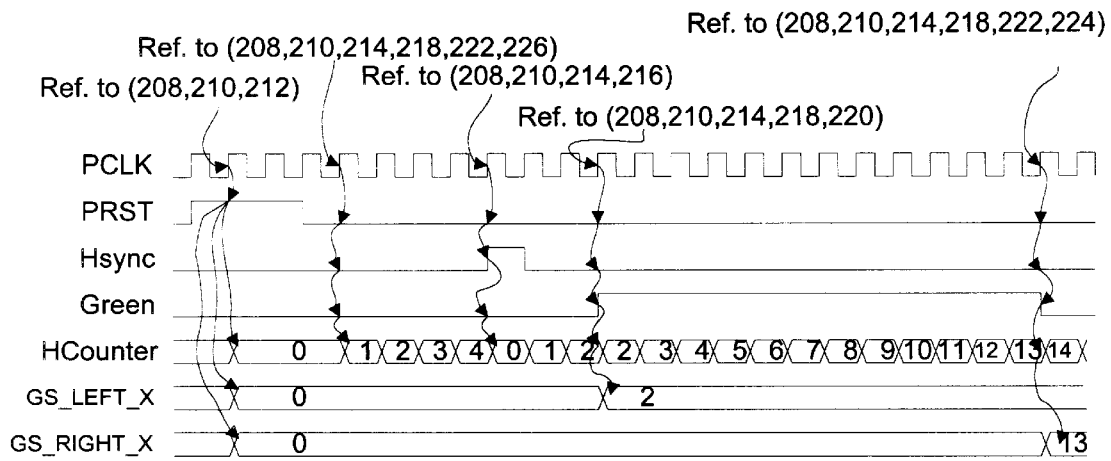
FIGS. 11A and 11B are timing diagrams with associated reference numerals for steps from FIGS. 9 and 10, generally show timing between signals for the horizontal display detector and vertical display detector, respectively.

The horizontal display detector 200 has a counter 204 (Hcounter) that receives the horizontal synchronous signal data, full block pattern data (green), reconstructed pixel clock time base data (PCLK) and reconstructed pixel clock time base reset data (PRST). The counter 204 determines the graphics screen X coordinate value which is stored in the register block 30 and also determines the graphics screen right X coordinate value which is stored in register block 30. The horizontal display detector 200 determines a horizontal active screen region as corresponding to a period between a rising edge of the full block pattern and a falling edge of the full block pattern in relation to the horizontal synchronous signal (see also FIG. 11A).

Similar to the horizontal display detector 200, the vertical display detector 202 includes a counter (Vcounter) 206 except in an addition to the signal data received by the horizontal display detector 200, the vertical display detector 202 also receives the Vsync signal data. The counter 206 generates the graphics screen top Y coordinate value and the graphics screen bottom Y coordinate value. Both the graphics screen top Y coordinate value and graphics screen bottom Y coordinate value are stored in the register block 30 for use by the overlay controller 34.

Figure 9:
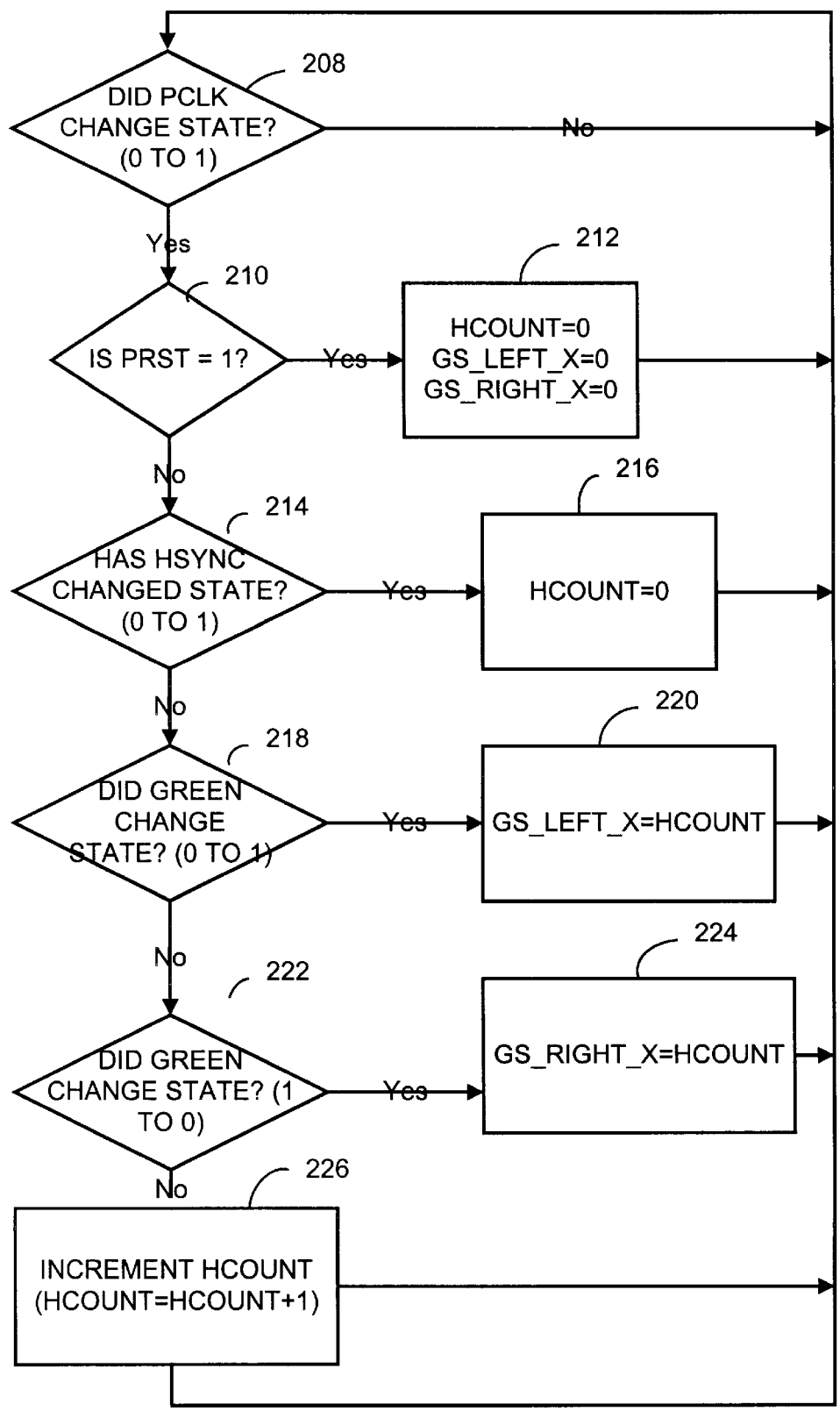
FIG. 9 is a flow diagram depicting one embodiment of the operation of the horizontal display detector shown in FIG. 8.

FIG. 9 shows the operation of the horizontal display detector 200 where the edge counter 204 detects whether the reconstructed pixel time base data changed state from a zero to a one as indicated in block 208. The counter 204 also detects whether the pixel reset signal is 1 indicating that a reset condition has occurred as shown in block 210. When a reset condition occurs, the counter 204 is set to 0 and the graphics screen left and right X coordinate values are also set to 0 as indicated in block 210.

If there is no reset condition, the counter 204 evaluates the horizontal synchronous signal to determine if a horizontal sync signal edge has occurred as indicated in block 214. If the horizontal edge has been detected, Hcount is set to 0 as shown in block 216. If no rising Hsync signal edge has been detected, the counter 204 determines whether the full block pattern in a horizontal direction has changed state from a zero to a one indicating a start of the block pattern, as indicated in block 218. If the full block pattern data indicates that the block has changed state, the graphics screen left X coordinate is set to the value in the Hcount register as indicated in block 220. If however, no change of state is detected in the full block pattern data, the counter 204 determines whether the green full color block pattern has change from a 1 to a 0 indicating an end of the full color block, as shown in block 222. If the full color block changed from a 1 to a 0 indicating an end to the horizontal block pattern, the Hcount value is set as the graphics screen right X coordinate value indicated in block 224. If the full block color pattern data does not indicate that the color went from a 1 to a 0, the Hcount value is incremented as indicated in block 226.

Figure 10:
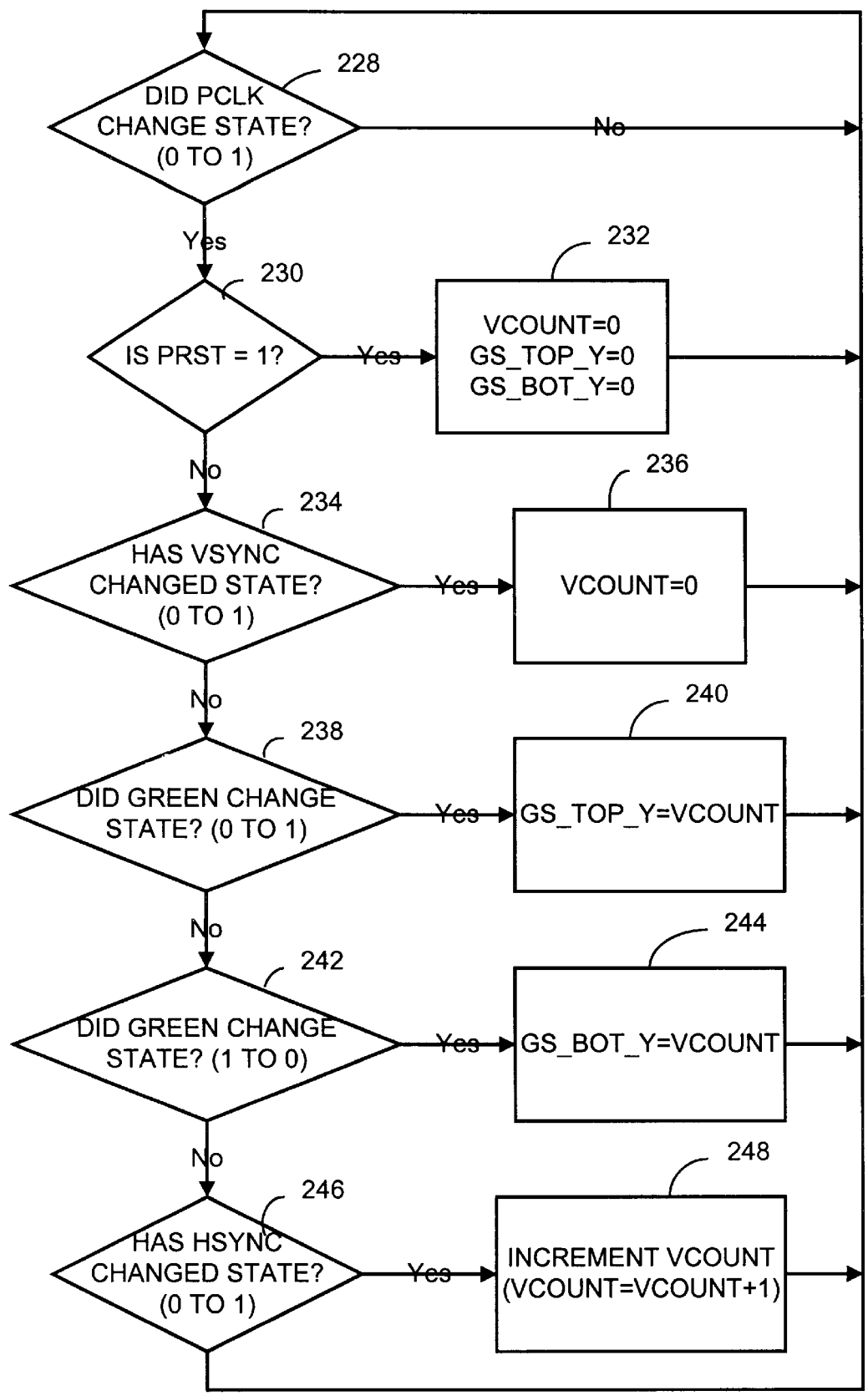
FIG. 10 is a flow diagram depicting the operation of the vertical display detector shown in FIG. 8.

FIG. 10 shows the operation of the counter 206 in the vertical display detector 202 which determines whether the reconstructed pixel clock time base data shows a change in clock state from a 0 to a 1 as indicated in block 228. If a change of state in the pixel clock from a 0 to a 1 has occurred, the PRST is analyzed to determine whether a pixel reset has occurred as indicated in block 230. If a reset has occurred Vcount value is set to 0 as well as the graphics screen top and bottom Y coordinate values as indicated in block 232. However, if no reset is detected, the Vsync signal data is analyzed to determine if an edge has occurred from a zero to a one as shown by block 234. If a Vsync rising edge has been detected, the Vcount value is set to 0 as indicated in block 236.

Figure 11B:
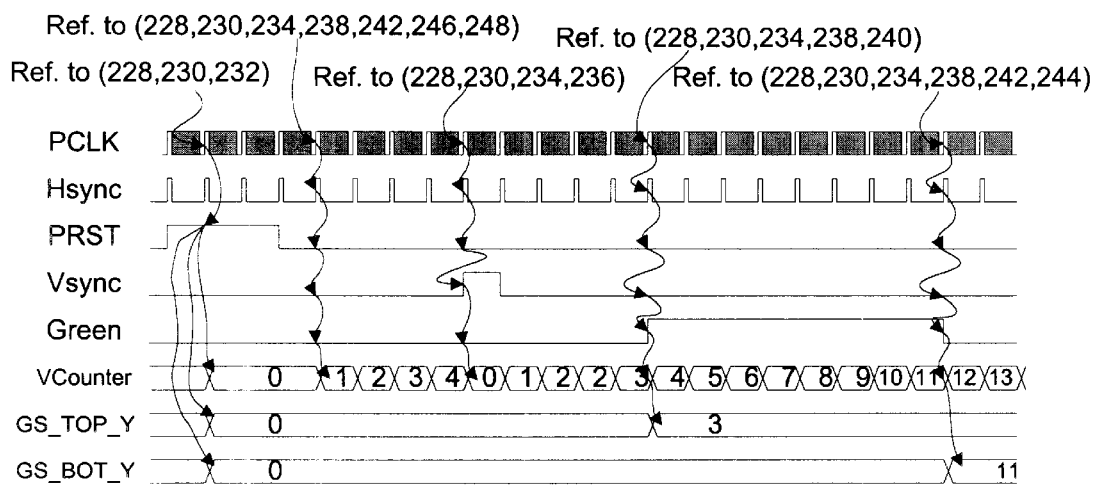

If the Vsync edge value is not equal to 1 meaning that a Vsync edge transition has not occurred, the counter looks at the full block pattern data to see whether or not the color pattern changed state in a vertical direction from 0 to a 1 indicating the start of vertical active screen region as indicated in block 237. If the full block color pattern changed state from a 0 to a 1, the counter sets graphics screen top Y coordinate value equal to the Vcount value shown as shown in block 240. If the full color block pattern has not changed state from a 0 to a 1, the counter evaluates the full block color data to determine whether the full color block pattern has changed state from a 1 to a 0 in the vertical direction indicating an end of a block pattern as shown in block 242. If the color block pattern data indicates change of state from a 1 to a 0, the counter sets the graphics screen bottom Y value to the value in the V counter as shown in block in 244. If however no change of state has been detected, the Hsync signal data is evaluated to determine if the rising Hsync edge has been detected meaning that Hsync edge equals 1 as shown in block 246. If the horizontal sync signal edge has been detected the Vcount is incremented shown in block 248. In this way, the vertical display detector 202 determines the vertical active screen region as corresponding to a period between a rising edge of a full block pattern and a falling edge of a full block pattern in relation to the Vsync signal data and by counting edges of the Vsync signal data relative to the Hsyn signal. The above operation can be more fully understood by reference to the timing diagram format shown in FIGS. 11A and 11B that show the relationship between the various inputs and outputs for the horizontal and vertical display detectors.

Since, the system 10 automatically reconstructs the pixel clock time base and subsequently determines the size and position of the active region of the screen automatically, the error introduced by user interaction is substantially eliminated. Moreover, the above method can be used periodically by the computer when the computer has been running for a predetermined time resulting in rising component temperatures. Hence, the system and method automatically rectifies the thermal drift problem when the method is used during high temperature use.

It should be understood that the implementation of other variations and modifications of the invention in its various aspects will be apparent to those of ordinary skill in the art, and that the invention is not limited by the specific embodiments described. For example, the vertical pattern data and full block pattern data may be any color or combination of colors. It is therefore contemplated to cover by the present invention, any and all modifications, variations, or equivalents that fall within the spirit and scope of the basic underlying principles disclosed and claimed herein.

What is claimed is:

1. A method to automatically align overlaying video data on a computer screen based on input information of R or G or B data, horizontal synchronization signal data (Hsync) and vertical synchronization signal data (Vsync) comprising:

reconstructing, a pixel clock time base of an underlying graphics source for use in aligning overlaid video, without confirming accuracy of an estimated pixel clock frequency; and detecting a size of an active computer screen region and position of a top left hand corner and a bottom right hand corner of the active computer screen region to align overlaying video using the reconstructed pixel clock time base.

2. The method of claim 1 wherein the step of reconstructing the pixel clock time base includes:

generating vertical pixel pattern data on the computer screen and determining a count of horizontal pixel transitions from the generated vertical pixel pattern data, determining a period of the horizontal synchronization signal data, determining a number of pixel clocks during the period of the horizontal synchronization signal data based on the determined count of horizontal pixel transitions, and programming a clock that serves as a reconstructed pixel clock time base of the underlying graphics source in response to the determined period of the horizontal synchronization signal data and the determined number of pixel clocks.

3. The method of claim 1 wherein the step of detecting the size of the active computer screen region and position of the top left hand corner and the bottom right hand corner of the active computer screen region includes the steps of:

filling the computer screen with a full block pattern, determining a horizontal active screen region as corresponding to a period between a rising edge of the full block pattern and a falling edge of the full block pattern in relation to the Hsync signal data using the reconstructed pixel clock time base, and determining a vertical active screen region as corresponding to a period between a rising edge of the full block pattern and a falling edge of the full block pattern in relation to the Vsync signal data using the reconstructed pixel clock time base and by counting edges of the Hsync signal to determine a number of lines within the vertical active screen region to facilitate overlaying video on the computer screen.

4. The method of claim 3 further including the steps of:

storing a left and right X coordinate value as an absolute position of the active screen region derived from the step of determining the horizontal active screen region as corresponding to a period between the rising edge of the full block pattern and a falling edge of the full block pattern in relation to the Hsync signal data; and storing a top and bottom Y coordinate value as an absolute position of the active screen region derived from the step of determining the vertical active screen region as corresponding to the period between the rising edge of the full block pattern and the falling edge of the full block patter in relation to the Vsync signal data and by counting edges of the Hsync signal to determine a number of lines within the vertical active screen region to facilitate overlaying video on the computer screen.

5. A method to automatically align overlaying video data on a computer screen based on input information of R or G or B data, horizontal synchronization signal data (Hsync) and vertical synchronization signal data (Vsync) comprising:

reconstructing a pixel clock time base of an underlying graphics source for use in aligning overlaid video, without confirming accuracy of an estimated pixel clock frequency using the steps of:
generating a vertical pixel pattern data on the computer screen;
determining a count of horizontal pixel transitions from the generated vertical pixel pattern data in relation to a period of the horizontal synchronization signal data; and
detecting a size of an active computer screen region and position of a top left hand corner and a bottom right hand corner of the active computer screen region to align overlaying video including the steps of:
filling the computer screen with a single color block pattern,
determining a horizontal active screen region as corresponding to a period between a rising edge of the color block pattern and a falling edge of the color block pattern in relation to the Hsync signal data using the reconstructed pixel clock time base, and
determining a vertical active screen region as corresponding to a period between a rising edge of the color block pattern and a falling edge of the color block patter in relation to the Vsync signal data using the reconstructed pixel clock time base and by counting edges of the Hsync signal to determine a number of lines within the vertical active screen region to facilitate overlaying video on the computer screen.

6. The method of claim 5 wherein the step of generating vertical pixel pattern data on the computer screen and determining the count of horizontal pixel transitions from the generated vertical pixel pattern data includes the steps of:

receiving at least master clock input data, vertical pixel pattern data, and Hsync signal edge data into a time base counter that counts a number of pixel transitions per horizontal sychronous signal transition;
receiving at least Hsync signal data and master clock data into a horizontal synchronous gate circuit to detect a transition in a horizontal synchronous signal;
multiplexing an output from the time base counter and the a horizontal synchronous gate circuit to produce a pixel clock count value;
storing the pixel clock count value for use in determining the reconstructed pixel clock time base; and
programming a phase locked loop to generate a clock that serves as a reconstructed pixel clock time base of the underlying graphics source.

7. The method of claim 5 wherein the step of determining a horizontal active screen region further includes the steps of:

receiving at least the horizontal synchronous signal data, the single color block pattern data, and the reconstructed pixel time base data in a first counter,
generating a left X coordinate value and a right X coordinate value based on the received data;
storing the left and right X coordinate values; and wherein the step of determining a vertical active screen region further includes the steps of:
receiving at least the horizontal synchronous signal data, the vertical synchronous signal data, the single color block pattern data, and the reconstructed pixel time base data in a second counter;
generating a top Y coordinate value and a bottom Y coordinate value based on the received data; and
storing the top Y coordinate and bottom Y coordinate values.

8. A system to automatically align overlaying video data on a computer screen based on input information of R or G or B data, horizontal synchronization signal data (Hsync) and vertical synchronization signal data (Vsync) comprising:

means for reconstructing a pixel clock time base of an underlying graphics source for use in aligning overlaid video, without confirming accuracy of an estimated pixel clock frequency;
means for detecting a size of an active computer screen region and position of a top left hand corner and a bottom right hand corner of the active computer screen region to align overlaying video using the reconstructed pixel clock time base.

9. The system of claim 8 wherein the means for reconstructing the pixel clock time base includes:

means for generating vertical pixel pattern data on the computer screen;
means, responsive to the vertical pixel pattern data, for determining a count of horizontal pixel transitions from the generated vertical pixel pattern data,
counter means for determining a period of the horizontal synchronization signal data and for determining a number of pixel clocks during the period of the horizontal synchronization signal data, and
means, operatively coupled to the counter means, for generating a clock that serves as a reconstructed pixel clock time base of the underlying graphics source.

10. The system of claim 8 wherein the detecting means includes:

means for filling the computer screen with full block pattern data,
means, responsive to the full block pattern data, for determining a horizontal active screen region as corresponding to a period between a rising edge of the full block pattern and a falling edge of the full block pattern in relation to the Hsync signal data using the reconstructed pixel clock time base, and
means, responsive to the full block pattern data, for determining a vertical active screen region as corresponding to a period between a rising edge of the full block pattern and a falling edge of the full block pattern data in relation to the Vsync signal data using the reconstructed pixel clock time base and by counting edges of the Hsync signal to determine a number of lines within the vertical active screen region to facilitate overlaying video on the computer screen.

11. The system of claim 10 further including:

means for storing a left and right X coordinate value as an absolute position of the active screen region as determined by the means for determining the horizontal active screen region; and means for storing a top and bottom Y coordinate value as an absolute position of the active screen region as determined by the means for determining a vertical active screen region, to facilitate overlaying video on the computer screen.

12. A system to automatically align overlaying video data on a computer screen based on input information of R or G or B data, horizontal synchronization signal data (Hsync) and vertical synchronization signal data (Vsync) comprising:

(a) means for reconstructing a pixel clock time base of an underlying graphics source for use in aligning overlaid video, without confirming accuracy of an estimated pixel clock frequency including:
means for generating a vertical pixel pattern data on the computer screen;
means, responsive to the vertical pixel pattern data and the horizontal synchronous signal data, for determining a count of horizontal pixel transitions in relation to the horizontal synchronous signal data, and (b) means for detecting a size of an active computer screen region and position of a top left hand corner and a bottom right hand corner of the active computer screen region to align overlaying video, using the reconstructed pixel clock time base, including:
means for filling the computer screen with single color block pattern data,
means, responsive to the single color block pattern data, for determining a horizontal active screen region as corresponding to a period between a rising edge of the single color block pattern and a falling edge of the single color block pattern in relation to the Hsync signal data using the reconstructed pixel clock time base, and
means, responsive to the single color block pattern data, for determining a vertical active screen region as corresponding to a period between a rising edge of the full block pattern and a falling edge of the single color block pattern data in relation to the Vsync signal data using the reconstructed pixel clock time base and by counting edges of the Hsync signal to determine a number of lines within the vertical active screen region to facilitate overlaying video on the computer screen.

13. The system of claim 12 wherein the means for generating vertical pixel pattern data on the computer screen includes:

time base counter means for receiving at least master clock input data, vertical pixel pattern data, and Hsync edge data that counts a number of pixel transitions per horizontal synchronous signal transition;

horizontal synchronous gate means for receiving at least Hsync data and master clock data to detect a transition in a horizontal synchronous signal;

multiplexing means for multiplexing an output from the time base counter means and the horizontal synchronous gate means to activate a counter to produce a pixel clock count value;

means, operatively coupled to the multiplexing means, for storing the pixel clock count value for use in determining the reconstructed pixel clock time base; and means, responsive to the pixel clock count value, for generating a clock that serves as a reconstructed pixel clock time base of the underlying graphics source.

14. The system of claim 13 wherein the means for generating the clock that serves as a reconstructed pixel clock time base includes a divide by N counter for generating a phase lock loop feedback value and a phase lock loop circuit responsive to the phase lock loop feedback value and the Hsync signal data that generates the reconstructed pixel clock, where N is determined independent of the master clock frequency.

15. The system of claim 12 wherein the means for determining a horizontal active screen region further includes:

first counter means for receiving at least the horizontal synchronous data, the single color block pattern data, and the reconstructed pixel time base data, means for generating a left X coordinate value and a right X coordinate value based on the received data; and means for storing the left and right X coordinate values; and wherein the means for determining a vertical active screen region further includes:

second counter means for receiving at least the horizontal synchronous data, the vertical synchronous signal data, the single color block pattern data, and the reconstructed pixel time base data;

means for generating a top Y coordinate value and a bottom Y coordinate value based on the received data; and means for storing the top Y coordinate and bottom Y coordinate values.

16. The system of claim 15 further including an overlay controller, responsive to the reconstructed pixel time base and the left X coordinate value, the right X coordinate value, the top Y coordinate value and the bottom Y coordinate value, for overlaying video images in alignment on the computer screen.

* * * * *